(12) United States Patent
Linde

(10) Patent No.: US 10,987,877 B2
(45) Date of Patent: Apr. 27, 2021

(54) METHOD FOR PRODUCING A VEHICLE COMPONENT FROM A FIBER-REINFORCED PLASTIC

(71) Applicant: AIRBUS OPERATIONS GMBH, Hamburg (DE)

(72) Inventor: Peter Linde, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 44 days.

(21) Appl. No.: 16/223,338

(22) Filed: Dec. 18, 2018

(65) Prior Publication Data

US 2019/0202141 A1   Jul. 4, 2019

(30) Foreign Application Priority Data

Dec. 21, 2017   (DE) .................... 10 2017 130 927.6

(51) Int. Cl.
*B32B 41/00*   (2006.01)
*B29C 65/00*   (2006.01)
(Continued)

(52) U.S. Cl.
CPC ............ *B29C 66/721* (2013.01); *B29C 65/08* (2013.01); *B29C 65/221* (2013.01);
(Continued)

(58) Field of Classification Search
CPC ............ B29C 66/721; B29C 66/72141; B29C 66/532; B29C 66/0324; B29C 66/91441;
(Continued)

(56) References Cited

U.S. PATENT DOCUMENTS

| 4,309,905 A * | 1/1982 | Maizenberg ......... G01N 27/725 324/227 |
| 2011/0013954 A1* | 1/2011 | Domoto ............. G03G 15/2057 399/328 |

(Continued)

OTHER PUBLICATIONS

Campbell, F. C., ed., "Thermoplastic Composites: An Unfulfilled Promise," Manufacturing Processes for Advanced Composites, Chapter 10, Elsevier Advanced Technology, Oxford, GB, pp. 357-397 (2004).

(Continued)

*Primary Examiner* — Michael N Orlando
*Assistant Examiner* — Joshel Rivera
(74) *Attorney, Agent, or Firm* — Jenkins, Wilson, Taylor & Hunt, P.A.

(57) ABSTRACT

A method for producing a vehicle component from a fiber-reinforced plastic including providing a skin panel having an inner side, outer side and mounting portion. The skin panel is a fiber-reinforced thermoplastic material. At least one stiffening component has a connection surface. The stiffening component is a fiber-reinforced thermoplastic material. The stiffening component and skin panel are contacted wherein the connection surface lies on the mounting portion. The method includes areally warming a joining zone so the stiffening component and skin panel are welded together. The joining zone is cooled. A determined geometry of the combination of stiffening component and skin panel is compared with a predefinable geometry. The joining zone is re-warmed, deforming the stiffening component and the skin panel, and the method includes cooling in order to attain the predefinable geometry if the determined geometry deviates from the predefinable geometry.

11 Claims, 3 Drawing Sheets

(51) Int. Cl.
    *B29C 65/08*     (2006.01)
    *B29D 99/00*     (2010.01)
    *B29C 65/34*     (2006.01)
    *B29C 69/00*     (2006.01)
    *B64F 5/10*     (2017.01)
    *B29C 65/22*     (2006.01)
    *B29C 65/82*     (2006.01)
    *B64C 1/00*     (2006.01)
    *F28F 21/02*     (2006.01)
    *B29L 31/30*     (2006.01)
    *B29K 307/04*     (2006.01)
    *B29K 671/00*     (2006.01)

(52) U.S. Cl.
    CPC ............ *B29C 65/344* (2013.01); *B29C 65/82* (2013.01); *B29C 66/034* (2013.01); *B29C 66/0324* (2013.01); *B29C 66/0342* (2013.01); *B29C 66/112* (2013.01); *B29C 66/1122* (2013.01); *B29C 66/131* (2013.01); *B29C 66/4722* (2013.01); *B29C 66/532* (2013.01); *B29C 66/61* (2013.01); *B29C 66/72141* (2013.01); *B29C 66/73921* (2013.01); *B29C 66/91411* (2013.01); *B29C 66/91441* (2013.01); *B29C 69/00* (2013.01); *B29D 99/0014* (2013.01); *B64C 1/00* (2013.01); *B64F 5/10* (2017.01); *F28F 21/02* (2013.01); *B29C 65/348* (2013.01); *B29C 65/3492* (2013.01); *B29C 66/71* (2013.01); *B29C 66/7212* (2013.01); *B29K 2307/04* (2013.01); *B29K 2671/00* (2013.01); *B29L 2031/3076* (2013.01); *B29L 2031/3085* (2013.01); *B64C 2001/0072* (2013.01)

(58) Field of Classification Search
    CPC . B29C 65/344; B29C 69/00; B29C 66/91411; B29C 66/131; B29C 66/61; B29C 66/112; B29C 66/0342; B29C 66/034; B29C 65/221; B29C 65/82; B29C 66/4722; B29C 65/08; B29C 66/1122; B29C 66/73921; B29C 66/71; B29C 65/348; B29C 66/7212; B29C 5/3492; B29C 65/18; B29D 99/0014; B64F 5/10; B64C 1/00; B64C 2001/0075; F28F 21/02; B29K 2307/04; B29K 2671/00; B29L 2031/3085; B29L 2031/3076
    USPC .................... 156/60, 64, 350, 351, 378, 379
    See application file for complete search history.

(56) References Cited

U.S. PATENT DOCUMENTS

2016/0136879 A1    5/2016    Matsen et al.
2017/0355152 A1    12/2017    Joern

OTHER PUBLICATIONS

European Search Report for Application No. 18208138.0 dated May 23, 2019.

\* cited by examiner

METHOD FOR PRODUCING A VEHICLE COMPONENT FROM A FIBER-REINFORCED PLASTIC

CROSS-REFERENCE TO RELATED APPLICATION

This application claims priority to German Patent Application No. 10 2017 130 927.6 filed Dec. 21, 2017, the entire disclosure of which is incorporated by reference herein.

TECHNICAL FIELD

The disclosure herein relates to a method for producing a vehicle component from a fiber-reinforced plastic, and to a vehicle component and to a vehicle having a vehicle component of the type.

BACKGROUND

Relatively large vehicles, and in particular passenger aircraft, are increasingly produced using components composed of a fiber-reinforced plastic. In particular in the case of passenger aircraft, the components are often of large size in order to reduce the outlay for the connection of several components. In the use of large-sized components composed of fiber-reinforced plastics, however, deviations in shape, or surfaces which have to be reworked, may sometimes arise. For example, if skin panels are equipped with stiffening components, in some cases, parisons of a skin panel and parisons of stiffening components are placed jointly onto a molding tool in order to subsequently be warmed jointly in an autoclave for curing purposes. Different layer thicknesses can give rise to different rates of cooling after the warming process. For example, a stiffening component has not yet completely cooled in a connection region while adjacent skin panels without stiffening component have already completely cooled. This can give rise to different expansions, which are manifest as a certain undulation on the outer surface.

Furthermore, in the case of fiber-reinforced plastics, it may be the case that fibers embedded into the matrix lie partially one above the other or are not oriented entirely straight. This gives rise to a relatively fine but noticeable undulation.

Connection methods for fiber-reinforced plastics in particular in the aviation industry are often based on the use of rivets. It sometimes cannot be ruled out that such riveted connections lead to visible rivets on the outer surface of the component produced.

These three types of deviations in shape can be eliminated through various measures. These have in common the additional at least local application of additional thin layers of a material before the entire surface of the component is subsequently subjected to material-removing processing. This can be cumbersome and can also increase the weight of the component produced. If this is a component of an aircraft, this should be avoided where possible.

It would be desirable to have a method for producing in particular large-sized components from a fiber-reinforced plastic, which method does not lead to the stated deviations in shape.

SUMMARY

It is consequently an object of the disclosure herein to provide a method for producing a component from a fiber-reinforced plastic, in which particularly advantageous component and surface quality can be produced without additional application of material.

Such an object is achieved by a method having features disclosed herein.

A method for producing a vehicle component from a fiber-reinforced plastic is disclosed herein. The method comprises providing at least one skin panel having an inner side, an outer side and a mounting portion arranged on the inner side, wherein the skin panel is composed of or comprises a fiber-reinforced thermoplastic material, of providing at least one stiffening component having a connection surface, wherein the stiffening component is composed of or comprises a fiber-reinforced thermoplastic material, of contacting the at least one stiffening component and the at least one skin panel such that the connection surface lies on the mounting portion, of areally warming a joining zone in which the connection surface of the stiffening component and the mounting portion are situated such that the at least one stiffening component and the at least one skin panel are welded to one another, of cooling the joining zone, of comparing a determined geometry of the combination of stiffening component and skin panel with a predefinable geometry, and of re-warming the joining zone, deforming the stiffening component and the skin panel, and cooling in order to attain the predefinable geometry if the determined geometry deviates from the predefinable geometry.

The method fundamentally deviates from known methods in that, instead of a fiber-reinforced material based on thermosets, use is made of a thermoplastic material with reinforcement fibers. The suitable thermoplastic materials for realizing the matrix may comprise PPS (polyphenylene sulphide), PEEK (polyether ether ketone), PEKK (polyether ketone ketone) or others. The reinforcement fibers may furthermore be selected in a manner dependent on the intended use, and comprise for example carbon fibers, glass fibers, aramid fibers, Kevlar fibers and the like.

This material use leads to particular advantages with regard to the correctability of any deviations in shape. In the case of thermoset materials, reinforcement fibers can be embedded into a liquid or pasty component which is composed of or comprises a resin system. After the curing of the resin, no further shape corrections can be performed there. The process of curing is irreversible, and it is necessary for particular precautions to be taken so that the desired shape is obtained or maintained during the curing of the resin.

Through the use of a thermoplastic material for the embedding of reinforcement fibers, a retroactive correction of the geometry is however possible. If, in the example mentioned in the introduction, a stiffening component is implemented with an inner side of a skin panel, it is theoretically possible for a certain deviation in shape to arise during the curing process even in the case of a thermoplastic, fiber-reinforced plastic being used. This is, however, eliminated according to the disclosure herein in that, after detection of a deviation from a set point geometry, local re-warming can be performed in order to mechanically change the composite composed of stiffening component and skin panel to the desired set point geometry. The process of curing is entirely reversible in the case of a thermoplastic material.

The proposed method, however, also has the particular advantage that it is possible to practically entirely dispense with riveted connections. Because of the reversible curing of the material, it is even possible for material to be locally melted such that the molten regions of two components to be connected to one another interfuse, resulting, in practical terms, in a monolithic component. For the production of a connection, there is consequently no need to produce riveted connections by drilling, deburring, cleaning, sealing, introducing the rivet body and deforming the rivet body. It is sufficient to perform local warming, as a result of which the two joining partners in question can, in particular under the additional action of a pressure force, form a cohesive connection.

As a result of the local areal warming of a connection region between the components to be connected, it is moreover possible for the entire warming of the composite composed of skin panel and stiffening component to be restricted to a very small region, that is to say an extremely small volume. As a result, expansion effects because of temperature gradients in the component are considerably lessened per se.

It is sought to limit the warming to a very thin layer in order to utilize this advantage. The connection region may be warmed by inductive methods, the use of heating resistors or by transmission, wherein the integration of a heating layer on one of the components to be connected to one another is preferred.

Consequently, by the method according to the disclosure herein, the use of rivets can be restricted or eliminated. The resulting uneven surface caused by protruding rivet heads or the like can be avoided. At the same time, warming-induced undulations of the components produced can be considerably reduced, and furthermore eliminated much more easily. An additional application of material to an outer surface of the component produced is consequently not necessary.

It is pointed out at this juncture that the mounting portion on the inner side of the skin panel does not need to have a particular design. Rather, the mounting portion may be a defined surface region in which the connection surface of the at least one stiffening component is placed on. Furthermore, the connection surface of the at least one stiffening component is, in the simplest case, merely a surface whose profile corresponds to the mounting portion. The connection surface serves merely for producing flush areal contact between the at least one stiffening component and the at least one skin panel in order to subsequently effect a welded connection by local warming.

In one advantageous embodiment, the provision of the at least one skin panel has the parallel spreading-apart of reinforcement fibers and the embedding of the reinforcement fibers in a thermoplastic matrix material. This is to be understood to mean that, for this purpose, a fiber bundle can, by mechanical combing or a similar process, be worked into a flat layer arrangement with mutually parallel reinforcement fibers. As a result of the combing of the reinforcement fibers, these can be embedded in particular with predetermined spacings, and with a precisely set orientation and a predetermined layer thickness, into the matrix material. For example, such a flat layer arrangement with parallel fibers in a thermoplastic resin can be provided as this narrow unwoven strips or fabric layers. These can subsequently be laid with desired fiber directions on a corresponding molding tool to form a relatively large skin panel and connected to one another. In this way, the overlapping of different amounts of reinforcement fibers can be suppressed, which can eliminate the fine undulation of the component produced.

In one advantageous embodiment of the disclosure herein, the step of laying a conductive layer onto the connection surface and/or the mounting portion is also performed, wherein the areal warming includes the application of a voltage via the conductive layer. The conductive layer serves in particular as a heating resistor layer. It may be designed as a foil or as a fabric. The material of the layer should exhibit adequate conductivity, and may in particular be composed of a metallic material and/or comprise a relatively high fraction of carbon. It is expedient to define connection lines, connection points or the like, which are connected to the conductive layer and which project out of the connection region, such that the electrically conductive layer can be contacted with an external voltage source. The layer is provided for initiating a current flow through the layer as a result of application of a voltage, which current flow leads to warming of the layer because of the electrical resistance thereof. In this way, it is possible for only the connection surface and the mounting portion to be warmed in targeted fashion. Here, the layer should be designed to be as fine as possible, such that its subsequent remaining in the component produced leads to only a negligible increase in weight. However, the layer should also be dimensioned such that adequate heating power can be realized. In general, in this embodiment, it would be possible to ensure that the voltage and/or the current intensity that is generated during the heating of the conductive layer are/is monitored or limited, such that damage to the conductive layer can be prevented.

The conductive layer may be produced in the form of a grid composed of linear elements composed of a material comprising carbon. For this purpose, consideration could be given for example to carbon fibers or carbon nanotubes. With the linear elements, it would be possible for square, rectangular or other regularly shaped meshes to be formed. In this way, warming of the connection region can be performed on a mesh-by-mesh basis. In this way, depending on the size of the meshes, the entire connection region is warmed. The enclosed area does not need to be filled with material exclusively for the purposes of warming.

In one particularly advantageous embodiment, the conductive layer is composed of or comprises a grid of carbon nanotubes, which exhibit particularly high tensile strength and electrical conductivity adequate for the purposes of the warming. The integration of such a grid leads to considerable weight advantages, because the weight additionally introduced because of the carbon nanotubes is practically not measurable.

Furthermore, the warming can also be performed by local introduction of ultrasound waves. In the case of such a method, also referred to as ultrasound welding, heat is generated as a result of the conversion of ultrasound vibrations into mechanical vibrations. Via an interface in the form of a sonotrode, the vibrations are conducted to one or both joining partners. This leads to interface and molecular friction, which leads to local warming. In the present case, it would be expedient for soundwaves to be applied to the at least one stiffening component. In particular by very short sound pulses in a particular clocked pattern, local concentrated warming in the connection region can be achieved.

In a particularly preferred embodiment, the cooling has the step of maintaining a moderate warming of the connection region during the cooling. The cooling of the connection region in which the components have been welded together is consequently influenced by a maintained introduction of heat. This could be realized by virtue of the conductive layer being connected to a control unit which is connected to a voltage source. A control unit can for example apply a particular voltage to the electrically conductive layer, or set a particular current intensity, for the purposes of carrying out warming that is adequate for a welding process. In particular, maximum heating power is attained with a maximum current intensity. For the purposes of the cooling, the heating power can be reduced at least at one point in time and over at least one time period. The heating power is preferably reduced such that the heat loss from the connection region to the outside exceeds the heating power that is then still supplied. This means that the heat loss is significantly slowed in relation to a simple separation of the conductive layer. This leads to gentler cooling of the connection region, whereby any thermal stresses and expansion effects can be yet further reduced. It is conceivable for the control unit to be designed for carrying out multiple heating power reductions during the cooling process. The expedient number of such steps, and the respective time periods thereof, are dependent on the type and nature of the joining partners. It would preferably be possible for a control unit of the type to be designed to determine the number of heating power reduction steps, and the time periods thereof, on the basis of theoretically or experimentally determined cooling curves.

In a further advantageous embodiment, the laying-on of an electrically conductive layer includes the integration of a sensor wire which is connectable to a control unit, wherein the control unit controls a cooling process by a feed of heating power by a feed of electrical power to the electrically conductive layer on the basis of a temperature determined by the sensor wire. The sensor wire may be provided from the same material as, or with a similar material nature to, the electrically conductive layer. Such a sensor wire may extend over a particular part of the electrically conductive layer, and may be electrically connected to the control unit from the outside. The sensor wire is designed to change its electrical resistance as a function of the temperature. The control unit may determine the temperature in the connection region on the basis of the measured resistance. On the basis of the temperature determined in the connection region, the heating power can be set for the controlled cooling. In this way, an experimental or theoretical determination of cooling curves can be substantially dispensed with, and the cooling is performed directly on the basis of a present temperature in the connection region.

The additional step of the warming and deformation may comprise, for example, the placement of a molding tool on an inner side of the skin panel and the application of a deforming force in an outward direction, that is to say in the direction of the outer side of the skin panel. The molding tool may for example be adapted to the at least one stiffening component, and, after the re-warming, permits an easy shape correction.

The re-warming may however extend over a region larger than merely the connection region. In this way, thermal stresses can be dissipated also in adjacent regions, such that the predefinable geometry is attained. This re-warming may be performed in particular by a heating device which is arranged on the molding tool.

The disclosure herein also relates to a vehicle component which has at least one skin panel and at least one stiffening component arranged on an inner side of the skin panel, wherein the vehicle component is produced by a method as mentioned above.

The disclosure herein also relates to a vehicle which has at least one such vehicle component. The vehicle may in particular be an aircraft, and preferably a passenger aircraft.

The disclosure herein may furthermore relate to a system which is designed for producing a vehicle component from a fiber-reinforced plastic. The system may have a control unit, a molding tool, a heating device and a measuring device. The control unit could furthermore be connected to a heating device. The control unit could be designed to activate the heating device in order to warm a connection region between the abovementioned skin component and the at least one stiffening component and, by the measuring device, detect whether, after the cooling, a geometry determined by the measuring device deviates from a predefinable geometry. If this is the case, the control device can activate the molding tool and the heating device such that re-warming is performed and the molding tool performs a deformation.

BRIEF DESCRIPTION OF THE DRAWINGS

Further features, advantages and possible uses of the disclosure herein will emerge from the following description of the exemplary embodiments and the figures. Here, all of the features described and/or illustrated in the example figures form the subject matter of the disclosure herein independently and in any desired combination, even irrespective of their combination in the individual claims or in the back-references thereof. Furthermore, in the figures, the same reference designations are used for identical or similar objects.

DETAILED DESCRIPTION

Figure 1:
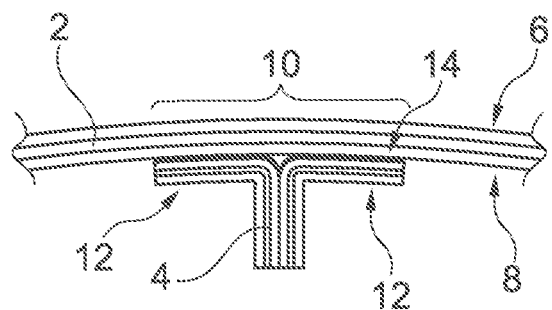
FIG. 1 shows a partial section of a vehicle component in the process of being produced.

FIG. 1 shows a skin panel 2 and a stiffening component 4 in a schematic illustration. The skin panel 2 has an outer side 6, an inner side 8 and a mounting portion 10 provided there. The stiffening component 4 is designed for example as a longitudinal stiffening element (stringer) for a skin shell of an aircraft. The stiffening component 4 has, merely by way of example, two limbs 12 which provide a divided connection surface 14. The connection surface 14 is in areal contact with the mounting portion 10 on the inner side 8 of the skin panel 2.

Both the skin panel 2 and the stiffening element 4 are produced from a fiber-reinforced thermoplastic material. This may be for example PEEK or PEKK with embedded carbon fibers as reinforcement fibers.

The reinforcement fibers are merely indicated in this illustration. As a result of the warming of a connection region between the stiffening element 4 and the skin panel 2, which encompasses the mounting portion 10 and the connection surface 14, the two components 2 and 4 can be welded to one another. In this way, in regions, a thermoplastic matrix material is melted on such that thorough mixing of the material of the two components 2 and 4 occurs locally in the joining region. After the cooling, a practically monolithic composite is consequently present.

Figure 2:
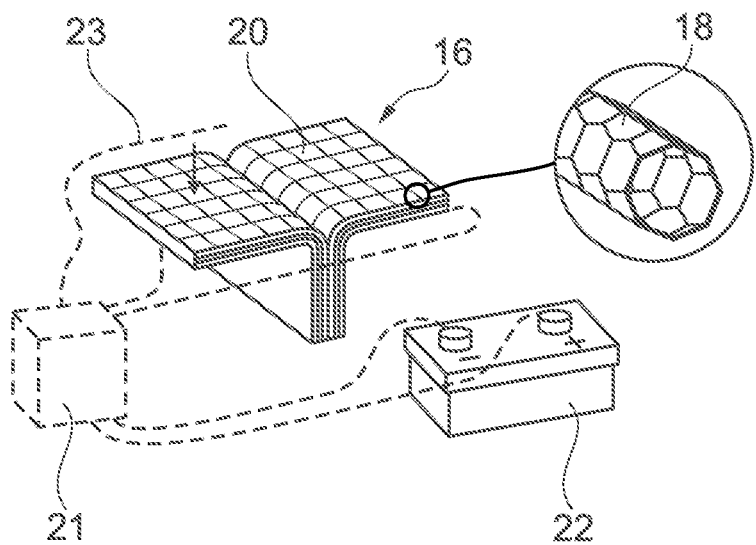
FIG. 2 shows a detailed view of a stiffening component with a conductive layer arranged thereon for the warming of a connection region.

Local warming may be realized in particular by arrangement of an electrically conductive layer 16. This is illustrated in FIG. 2 from a grid of carbon nanotubes 18, which have multiple meshes 20. By connection of the electrically conductive layer 16 to a voltage source 22, the layer 16 warms up, such that warming is performed only in the joining region.

The warming may be controlled by an optional control unit 21. The control unit 21 and corresponding connection lines are illustrated by dashed lines. Furthermore, during the cooling of the connection region, slight warming may be maintained, such that the cooling takes place more gently. This may be realized in particular by the control unit 21 through reduction of the supply of current.

It is furthermore optionally possible for a sensor wire 23 to be provided, with the aid of which the temperature in the interior of the connection region can be monitored by the control unit 21. Control of the cooling can be performed on the basis of this monitoring.

Figure 3:
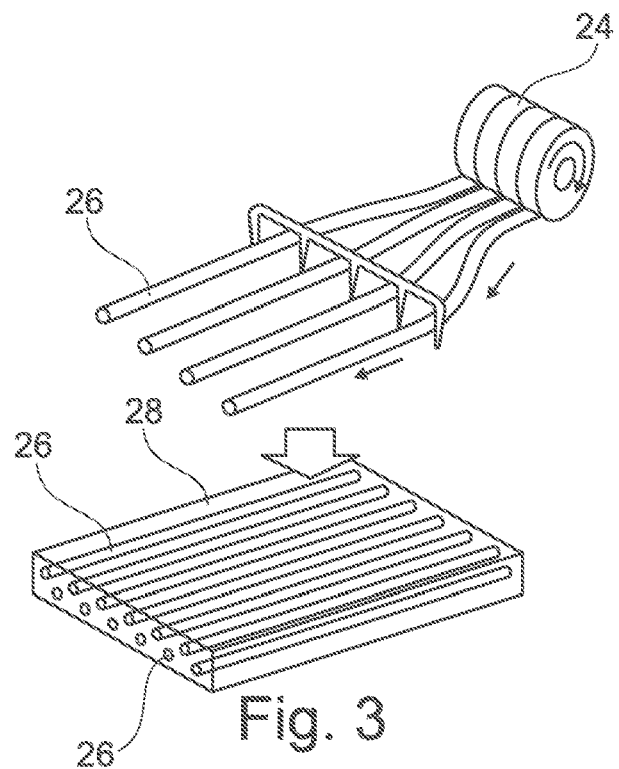
FIG. 3 shows the spreading-apart of reinforcement fibers during the production of a skin panel.

Particularly advantageous surface quality is achieved if the fibers of the components 2 and 4 are oriented parallel to one another and have no particular undulation. In this regard, it is illustrated in FIG. 3 that fiber strands 24 for producing in particular the skin panel 2 can be spread apart by combing. In this way, fibers 26 oriented perfectly parallel to one another and adjacent to one another are provided, which can be incorporated into a thermoplastic matrix material 28. It is conceivable for multiple layers of a fiber-reinforced material to be produced from thermoplastic material and with combed fibers, and for these layers to be assembled in the form of webs or strips.

Figure 4:
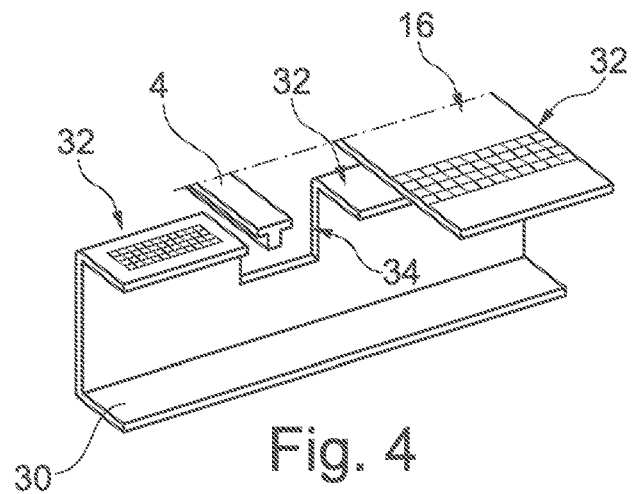
FIG. 4 shows a detailed view of a connection region of a stiffening component.

FIG. 4 shows a variant of a stiffening component 30 with multiple portions 32 or segments of a connection surface, which are equipped with the above-illustrated grid of carbon nanotubes. The stiffening component 30 may furthermore, by way of example, have a cutout 34 through which a stiffening component 4 as per FIG. 1 can extend. The stiffening component 30 could therefore be a part of a fuselage rib, whereas the stiffening component 4 is a part of a longitudinal stiffening element (stringer).

Figure 5:
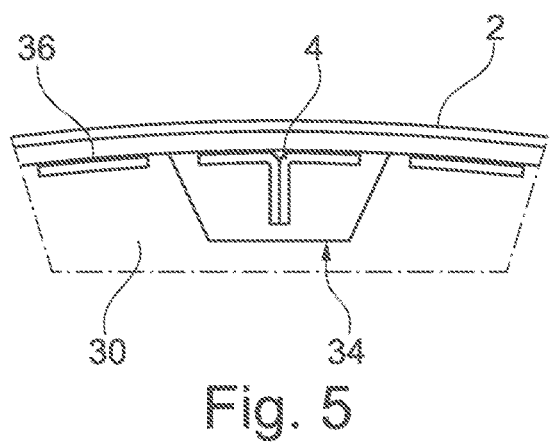
FIG. 5 shows the partial section from FIG. 1 with a stiffening component from FIG. 4 arranged thereon.

The elements from FIG. 4 are illustrated in FIG. 5 in assembled form with a skin panel 2, which may form a part of a fuselage skin. The surface denoted by a solid dark line can be interpreted as connection region 36, in which the welding is performed.

Figure 6:
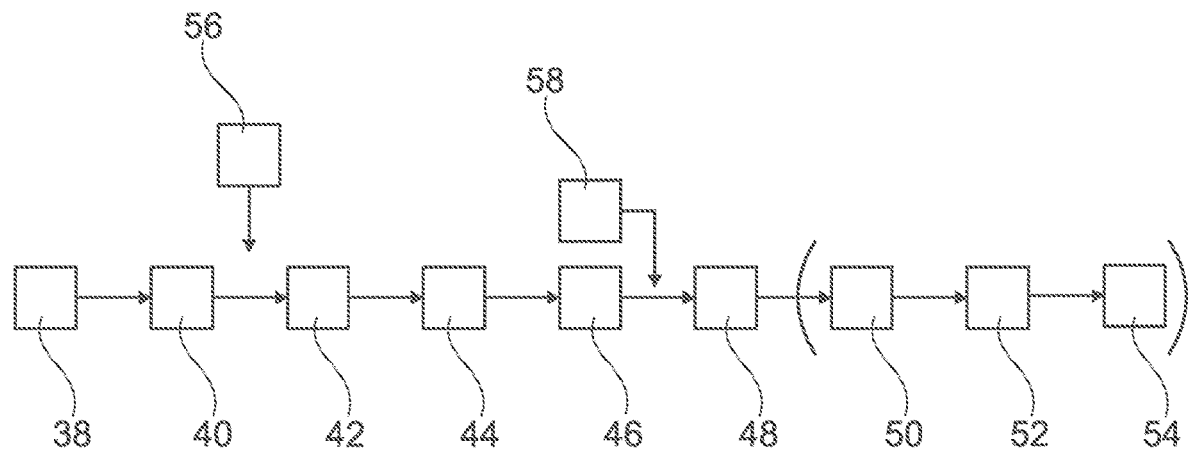
FIG. 6 shows a block-based illustration of the method according to the disclosure herein.

FIG. 6 shows the method according to the disclosure herein schematically in the form of a block diagram. The method has the steps of providing 38 at least one skin panel 2 having an inner side 8, an outer side 6 and a mounting portion 10 arranged on the inner side 8, of providing 40 at least one stiffening component having a connection surface 14, of contacting 42 the at least one stiffening component and the at least one skin panel such that the connection surface lies on the mounting portion, of areally warming 44 a joining zone in which the connection surface of the stiffening component and the mounting portion are situated such that the at least one stiffening component and the at least one skin panel are welded to one another, of cooling 46 the joining zone, of comparing 48 a determined geometry of the combination of stiffening component and skin panel with a predefinable geometry, and of re-warming 50 the joining zone and of deforming 52 the stiffening component and the skin panel, and of cooling 54 in order to attain the predefinable geometry if the determined geometry deviates from the predefinable geometry. The method may furthermore include the laying 56 of a conductive layer onto the connection surface and/or the mounting portion. During the cooling 46, it is furthermore also possible for moderate warming of the connection region to be maintained 58.

Figure 7:
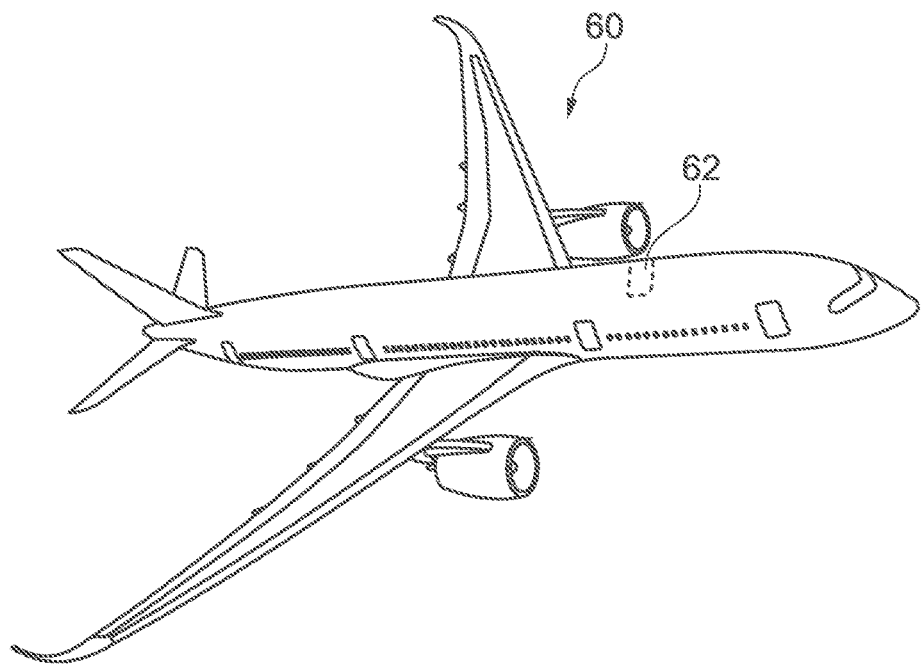
FIG. 7 shows an aircraft having one or more vehicle components produced by a method according to the disclosure herein.

Finally, FIG. 7 discloses a passenger aircraft 60 which has at least one component 62 produced by the method according to the disclosure herein. This is indicated merely by way of example by a dashed line. All other components may likewise be produced by a method according to the disclosure herein.

It is additionally pointed out that "having" does not rule out other elements or steps, and "a" or "an" do not rule out a multiplicity. It is also pointed out that features that have been described with reference to one of the above exemplary embodiments may also be used in combination with other features of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a vehicle component from a fiber-reinforced plastic, the method comprising:
   providing at least one skin panel having an inner side, an outer side and a mounting portion on the inner side, wherein the skin panel comprises a fiber-reinforced thermoplastic material;
   providing at least one stiffening component having a connection surface, wherein the stiffening component comprises a fiber-reinforced thermoplastic material;
   contacting the at least one stiffening component and the at least one skin panel such that the connection surface lies on the mounting portion, such that the mounting portion of the at least one skin panel is in flush areal contact with the connection surface of the at least one stiffening component;
   areally warming a joining zone in which the connection surface of the stiffening component and the mounting portion are situated such that the at least one stiffening component and the at least one skin panel are combined by being welded to one another;
   cooling the joining zone;
   comparing a determined geometry of the combined stiffening component and skin panel with a predefinable geometry; and
   re-warming the joining zone, deforming the stiffening component and/or the skin panel, and cooling to attain the predefinable geometry when the determined geometry deviates from the predefinable geometry.

2. The method according to claim 1, wherein providing the at least one skin panel has a parallel spreading-apart of reinforcement fibers and embedding of the reinforcement fibers in a thermoplastic matrix material.

3. The method according to claim 1, wherein the connection surface and/or the mounting portion comprise a conductor, and wherein the areal warming includes applying a voltage through the conductive layer.

4. The method according to claim 3, wherein the conductor is in a form of a grid comprising linear elements that comprise a material comprising carbon.

5. The method according to claim 3, wherein the conductor comprises a grid comprising carbon nanotubes.

6. The method according to claim 1, wherein the warming comprises local introduction of ultrasound waves.

7. The method according to claim 1, wherein the cooling comprises maintaining a moderate warming of the joining zone during the cooling.

8. The method according to claim 3, wherein:
the cooling comprises maintaining a moderate warming of the joining zone during the cooling,
the conductor includes a sensor wire, which is connectable to a control unit and integrated into whichever of the connection surface and/or mounting surface the conductor is located, and
the control unit controls a cooling process by a feed of heating power by a feed of electrical power to the conductor based on a temperature determined by the sensor wire.

9. The method according to claim 1, wherein re-warming and deforming comprises placing a molding tool on an inner side of the skin panel and applying a deforming force in an outward direction.

10. The method according to claim 1, wherein the vehicle component is for a vehicle.

11. The method according to claim 10, wherein the vehicle is an aircraft.

* * * * *